Nov. 2, 1965 W. C. GARDINER 3,215,614
AMALGAM DECOMPOSER
Filed Jan. 5, 1962 2 Sheets-Sheet 1

INVENTOR:
WILLIAM C. GARDINER
BY
Gordon D Byrket
AGENT

Nov. 2, 1965 W. C. GARDINER 3,215,614
AMALGAM DECOMPOSER
Filed Jan. 5, 1962 2 Sheets-Sheet 2
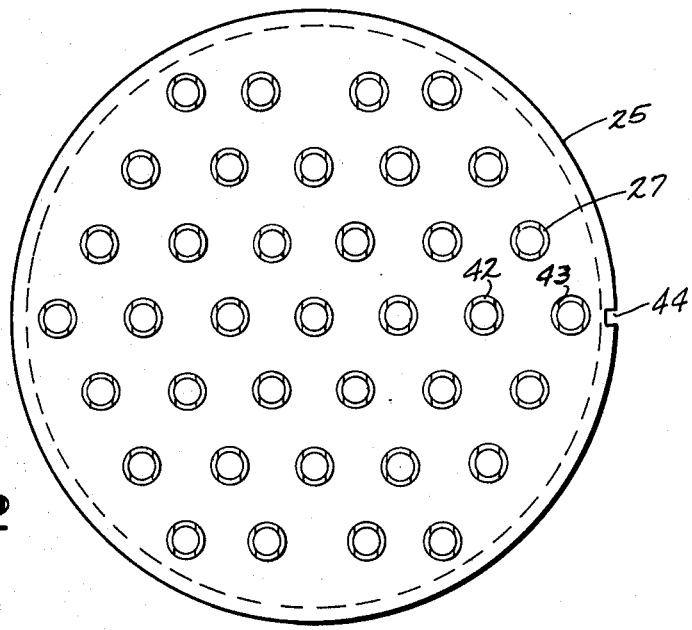
FIG-2
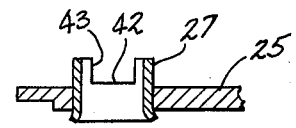
FIG-3
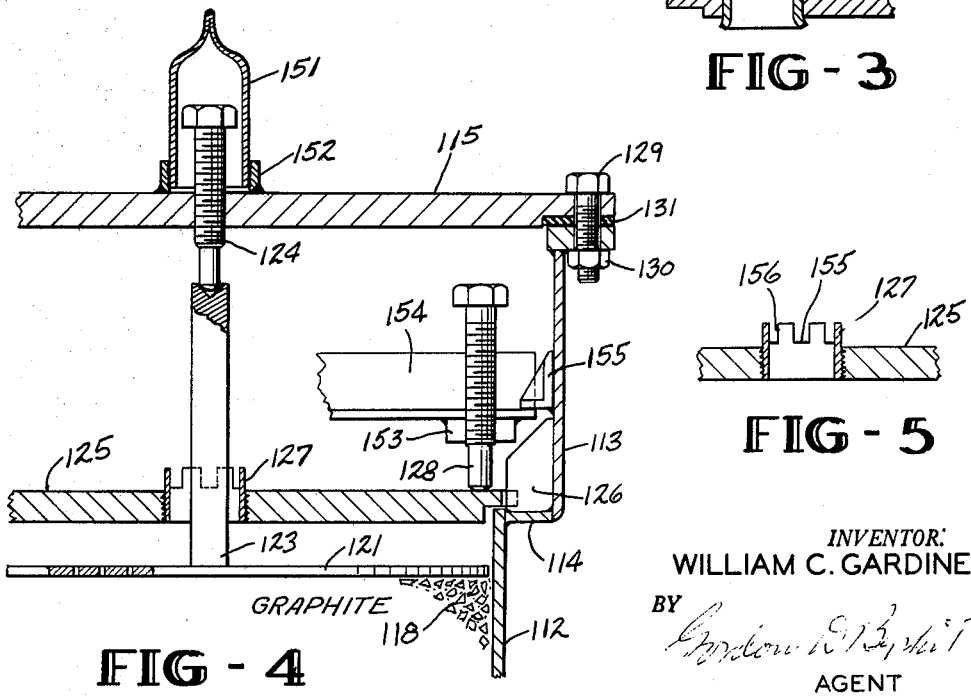
FIG-4
FIG-5
INVENTOR:
WILLIAM C. GARDINER
BY
AGENT

United States Patent Office 3,215,614
Patented Nov. 2, 1965

3,215,614
AMALGAM DECOMPOSER
William C. Gardiner, Darien, Conn., assignor to Olin Mathieson Chemical Corporation, a corporation of Virginia
Filed Jan. 5, 1962, Ser. No. 164,477
1 Claim. (Cl. 204—249)

This invention relates to improvements in amalgam decomposers which are used in conjunction with mercury cathode chlor-alkali cells. More particularly this invention relates to improvements in the method of distributing the amalgam in such decomposers and provides means for efficient decomposition of the amalgam.

Horizontal mercury cells usually consist of an enclosed, elongated trough which slopes slightly toward one end. The cathode is a flowing layer of mercury which is introduced at the higher end of the cell and flows along the bottom of the cell toward the lower end. The anodes are generally composed of rectangular blocks of graphite suspended from conductive lead-ins so that the bottom of the graphite anode is spaced a short distance above the flowing mercury cathode. An aqueous electrolytic solution, for example, a brine of sodium chloride is fed to the upper end of the cell, covering the anodes and flowing concurrently with the mercury. The impressed electric current passing through the electrolytic solution between the anodes and the mercury cathode liberates chlorine at the anodes and sodium is dissolved in the mercury as an amalgam. The sodium amalgam flows from the lower end of the cell to a decomposer where it is contacted with water to form sodium hydroxide, hydrogen and mercury. The mercury is recycled to the cell for reuse as cathode. Other aqueous electrolytes may be used particularly brines of alkali metal halides, for example, potassium chloride and lithium chloride and also barium chloride and sodium sulfate.

The decomposition reaction between the amalgam and water does not proceed readily due to the high overvoltage of hydrogen and the discharge of hydrogen as gas must be facilitated by contact of the amalgam and water with a discharge electrode material, most commonly graphite. The decomposer is usually packed with particles of graphite for this purpose.

Other decomposing fluids can be substituted for water including aqueous solutions, for example, of caustic soda, and lower aliphatic alcohols containing one to four carbon atoms.

Decomposers of both horizontal and vertical types have been designed and used in conjunction with mercury cells. Vertical types are preferred in many installations for their considerable economy of floor space. These vertical or tower type decomposers may be flooded with amalgam as in U.S. Patents 2,336,045 and 2,422,351 to Taylor or flooded with water or aqueous caustic as in U.S. Patent 2,083,648 to Gorke. In use, these prior art devices have not proved adequate and more elaborate devices exemplified by U.S. Patents 2,588,469 to Basilewsky and 2,732,284 and 2,837,408 to Sakowski have been devised. However, the packed tower is simpler, cheaper to construct, maintain and operate, provided the decomposition of a large volume of amalgam can be made as complete as possible. Decomposition here means removal of sodium from the amalgam.

Attempts to increase the throughput of a vertical decomposer by charging ever increasing amounts of amalgam and water eventually results in incomplete decomposition of the amalgam. Residual sodium in the recycle mercury leads to increased amounts of discharged hydrogen in the chlorine which may form explosive gas mixtures. Incomplete decomposition results primarily from channelling of the amalgam through the decomposer.

Thus the problem resides in improving the distribution of the amalgam in the decomposer and improving contact between amalgam, water and the discharge electrode material.

The improved decomposer of the present invention comprises:

(1) A container, preferably an elongated vertically disposed container having a bottom, an upper part constituting usually a minor proportion of its height and a lower part constituting usually a major proportion of its height, the upper part having a greater cross-sectional area than the lower part and a shoulder joining said upper and lower parts. The container is filled substantially to the level of the shoulder with a bed of graphite granules which is held between a lower and an upper perforated pressure plate. The upper perforated pressure plate has spaced anvils on its upper surface and rests on the bed of graphite particles clearing the walls of the lower part of the container to permit free vertical motion of the plate. The lower perforated plate is fixed on spaced pedestals elevating it above the bottom of the container to form a chamber between the lower plate and the bottom of the container. The container also has a mercury outlet in its bottom and a conduit for aqueous caustic or water in the lower part of the container or in the bottom. The conduit preferably extends internally into the chamber between the lower plate and the bottom of the container to deliver water near the center of the chamber. Alternatively, the conduit may be located to deliver water or remove aqueous caustic from a level above the lower plate. Amalgam inlet means are provided in the upper part of the container. An additional conduit is provided in the upper part of the container at a level higher than the amalgam inlet means. In counter current flow, when water is introduced via the conduit in the lower part of the container or in the bottom, the conduit in the upper part of the container functions as an aqueous caustic outlet. When flow is concurrent, water is introduced via the conduit in the upper part of the container and aqueous caustic is removed from the conduit in the lower part of the container or in the bottom. Advantageously, in the latter case, a standpipe is provided to maintain the level of water or aqueous caustic in the container.

(2) A cover detachably fastened to the container and having spaced adjustable means in the cover to engage the anvils on the upper perforated plate inside the container and to hold the upper perforated plate in contact with the bed of graphite. The cover may also have a hydrogen outlet therethrough or the hydrogen outlet may be in said upper part of the container at a level above that of the aqueous conduit.

(3) An amalgam distributor plate disposed internally of the container, resting on the shoulder between the upper and lower parts of the container and adjustable means urging the distributor against the shoulder. The distributor comprises a plate having a plurality of weirs extending through the plate. The weirs are spaced to receive the correspondingly spaced anvils on the upper perforated plate. The anvils extend through the weirs and receive on their upper ends the adjustable means depending from the cover. Ample clearance is provided between the anvils and the weirs for the downflow of amalgam and the upward flow of aqueous caustic and hydrogen through the weirs. The portion of each weir extending above the upper surface of the plate has a plurality of rectangular notches cut to a distance above the plate to maintain a pool of uniform depth of amalgam on the distributor plate. It is advantageous when each weir has two notches to arrange all their center lines parallel to each other and perpendicular to the line of flow of the entering amalgam. This serves to divert the flow of amalgam and maintain a uniform depth of amalgam on the distributor plate.

This, in turn, distributes the amalgam more uniformly through the lower part of the decomposer.

The weirs may or may not extend below the lower surface of the distributor plate. They may be internally rolled to fit tightly into the plate. The upper surface of the plate is machined to remove any distortion and made flat, preferably to within 0.005 inch to insure even distribution of the amalgam. The bottoms of the notches in the weirs are machined to the same elevation above the upper surface of the distributor plate. Alternatively and preferably the weirs are externally threaded and screwed into threaded holes in the plate to facilitate adjustment to uniform elevation above the plate.

The screw adjustable means whereby the distributor plate is held in place in contact with the shoulders of the container, in one alternative, are studs depending from the cover in a well having an internal threaded flange. Alternatively a spider is provided with bolts threaded through near the ends of the arms of the spider. The ends of the arms are slipped below corresponding angles or other fixing means attached to the wall of the upper part of the container. The spider may consist, for example, of six arms formed of angle iron.

The container also has a mercury outlet in the bottom. Denuded mercury flows or is pumped from there to the inlet of the cell or to an intermediate storage zone. A water conduit is provided in the bottom of the container or in its side near the bottom. Advantageous distribution of incoming water, when flow is countercurrent, is accomplished by extending the inlet to discharge the water near the center of the chamber formed between the lower perforated pressure plate and the bottom of the container.

The decomposer and all of its component parts are suitably fabricated of iron or carbon steel. It is conveniently cylindrical, though rectangular or other shapes can be used. The overall dimensions vary with the size of the electrolytic cell with which it operates in conjunction and the flow rate of amalgam per unit time to be decomposed. Ordinarily one decomposer is provided for each cell, though the amalgam from two or more cells may be processed through a single decomposer if desired. The walls and bottom are of suitable thickness to withstand deformation in use.

The graphite granule packing between the pressure plates is preferably broken pieces, screened to remove dust and fine particles. To reduce flow resistance encountered by the fluids, the particles are closely sized, for example, in the range of ¼ to ½ inch. Advantageously an uppermost and a lowermost layer of graphite particles in the bed may be somewhat larger, for example, ½ to ¾ inch.

FIGURE 1, partly in section, shows one form of the present invention;

FIGURE 2 is a top view of the amalgam distributor plate of FIGURE 1;

FIGURE 3 is a section of a portion of the amalgam distributor plate of FIGURE 2 showing the detail of one of the weirs;

Figure 1:
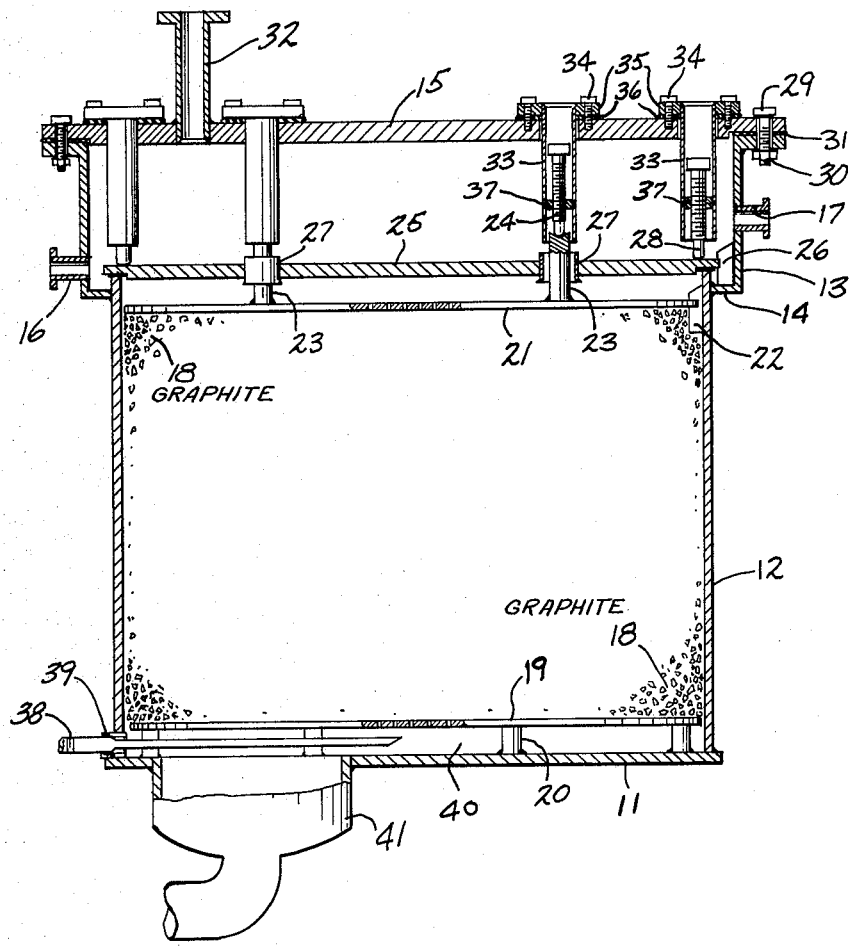

FIGURE 4, partly in section, shows another form of the present invention; and

FIGURE 5 is a section showing the detail of the alternative weir of FIGURE 4.

FIGURE 1 shows the container made up of a bottom 11, a lower part 12, an upper part 13 and a shoulder 14 joining the upper and lower parts and a cover 15. The upper part of the container has amalgam inlet 16 and aqueous caustic outlet 17. A bed of graphite granules 18 rests on lower perforated pressure plate 19 which is supported above bottom 11 on pedestals 20. Upper perforated pressure plate 21 rests on the graphite bed 18. Its angular position is controlled by guide fin 22 engaging a notch in the edge of plate 21. Spaced anvils 23 extend upwardly from plate 21 and engage studs 24. The latter are tightened as necessary to maintain graphite bed 18 tightly packed.

Amalgam distributor plate 25 rests on a part of shoulder 14. Its angular position is controlled by guide fin 26 engaging a notch in the edge of plate 25. A plurality of weirs 27 are rolled into plate 25 in register with anvils 23. Plate 25 is held in position by a plurality of studs 28.

Cover 15 is bolted to the upper part of container 13 by means of bolts 29 and nuts 30 with gasket 31 between. Hydrogen outlet 32 is provided in the cover. Wells 33 pass through cover 15 and are held in place by studs 34 drawing flanges 35 against gaskets 36. Internal flanges 37 are provided in the wells through which studs 24 and 28 are threaded. Studs 24 engage anvils 23 and thus hold upper perforated pressure plate 21 tightly against the graphite bed 18. Studs 28 engage distributor plate 25 near the edges and hold it in position against a part of shoulder 14.

Near the bottom of lower part 12 of the container is water inlet 38. It is threaded into sleeve 39 in the wall of the container and extends approximately to the center of chamber 40 formed between lower perforated pressure plate 19 and bottom 11. Mercury outlet 41 is provided in the bottom 11.

FIGURE 2 is the view of distributor plate 25. Weirs are shown at 27. Each weir has two rectangular notches having bottoms 42 and side walls 43. A notch is cut at 44 in the edge of plate 25 to engage guide fin 26 of FIGURE 1.

FIGURE 3 has parts 25, 27, 42 and 43 which are the same as in FIGURE 2.

FIGURE 4 shows an alternative form of the invention in which wells in the cover are eliminated. A fragment of the lower part of the container 112 is connected by shoulder 114 to upper part 113 of the container. Cover 115 is attached to upper part 113 by bolts 129 and nuts 130 with intervening gasket 131. Upper perforated pressure plate 121 rests on graphite bed 118. Anvils 123 extend upward from plate 121 and are longer than anvils 23 of FIGURE 1. The anvils pass through weirs 127 in amalgam distributor plate 125 resting on part of shoulder 114 and guided by guide fin 126. Studs 124 are threaded through cover 115 to engage anvils 123 and hold plate 121 tightly against graphite bed 118. Caps 151 are threaded into sleeves 152 welded to cover 115. Studs 128 holding plate 125 in place are threaded through nuts 153 welded to arms 154 of spider engaged under angles 155 welded to upper part 113 of the container.

FIGURE 5 shows in section details of weir 127 of FIGURE 4. It has rectangular notches defined by bottoms 155 and sides 156 and is threaded into distributor plate 125 to allow uniform and easy adjustment of the elevation of the bottom of the notches above the level of the distributor plate 125.

In use, the decomposer of FIGURE 1 is fed with amalgam through inlet 16 and it flows around the well formed by shoulder 14 and upper part 13 of the container. It also covers amalgam distributor plate 25 to a depth defined by the elevation of the bottoms 42 of weirs 27 above the plate 25, suitably ⅛ inch. To make this depth uniform, plate 25 is machined flat to 0.005 inch and, after rolling in the weirs, any distortion is removed to restore plate 25 to the same degree of flatness. (The decomposer is adjusted to maintain plate 25 level within about 0.05 inch.) The amalgam flows through the weirs and perforated pressure plate 21 to contact the graphite packing. The graphite bed is flooded with water introduced via 38 and the water flows upward countercurrent to the descending amalgam. During the passage in contact with the graphite, sodium is removed from the amalgam and forms aqueous caustic soda and hydrogen gas. Denuded mercury flows out of the decomposer at 41. Rising hydrogen and aqueous caustic soda pass through the weirs, the hydrogen being removed via outlet 32 and the aqueous caustic soda via outlet 17.

Initially, graphite bed 18 settles appreciably and upper pressure plate 21 is frequently tightened by means of studs 24 bearing on anvils 23. Such adjustment is less frequently required in subsequent use. Once the decomposer is assembled, adjustment of studs 28 is ordinarily not required. Studs 24 and 28 suitably have recessed means, for example, hexagonal wells in their heads to enable adjustment or removal of the studs. Wells 33 are provided to permit removal of the entire well and stud in case any sticking difficulties are encountered. Alternatively, however, the wells can be welded in place in the cover.

In assembly of the decomposer of FIGURE 4, studs 128 are tightened before cover 115 is in place. The graphite bed is kept compacted by removing caps 151 and adjusting studs 124 as necessary. Caps 151 are replaced to prevent leakage of hydrogen gas and to prevent unintentional alteration of the position of studs 124. In use, the decomposer of FIGURE 4 operates similarly to that of FIGURE 1.

*Example I*

A number of decomposers, similar to that shown in FIGURE 1, were fabricated of carbon steel and installed with an equal number of mercury cells. Each decomposer was about 40 inches high. The lower part of the container had a height of about 30 inches and a diameter of 36 inches. The upper part was about 9 inches in height and 40 inches in diameter. The shoulder joining the upper and lower parts of the container was a flat ring about 1½ inches between its inner and outer circumferences. The bottom had a 12 inch diameter outlet for mercury which led to a 3 inch pipe. Twelve pedestals 1½ inches in height were symmetrically arranged and welded to the bottom and the lower perforated pressure plate was welded thereto. Perforations consisted of ¼ inch diameter holes on ½ inch triangular spacing affording about 23 percent open area. In the side of the lower part of the container a water inlet was formed by swaging ½ inch pipe inside the threaded end of 1 inch pipe. The latter was threaded into a 1 inch nipple welded to the container. The ½ inch section extended approximately to the center of the chamber between the lower perforated pressure plate and the bottom of the container.

The lower part of the container was filled with crushed graphite on which was placed an upper perforated pressure plate. The latter had a diameter leaving clearance of ¼ inch between its edges and the walls of the lower part of the container.

The upper plate was perforated similarly to the lower plate. The upper plate carried 12 symmetrically arranged anvils 4 inches high and 1 inch in diameter. The plate was placed, anvils up, on top of the bed of graphite. The distributor plate had a diameter about 1½ inch greater than the internal diameter of the lower portion of the container. It rested on the shoulder with the anvils protruding through the weirs. The weirs were fabricated of 2 inch pipe rolled into holes symmetrically arranged to receive the anvils attached to the upper perforated pressure plate. Each weir had two rectangular diametrically opposite notches 1½ inches wide. All of the center lines of the notches were substantially parallel to each other and perpendicular to the center line of the amalgam inlet. The latter was arranged in the side of the upper part of the container just above the shoulder joining the upper and lower parts of the container. A caustic outlet was provided in the upper part of the container 180° from the amalgam inlet and at a higher elevation.

The cover, bolted to the top of the upper part of the container, carried a hydrogen outlet and a number of symmetrically arranged wells. The outer circle of wells had studs threaded through internal flanges in the wells. The studs were tightened to hold the distributor plate against the shoulder of the container. Additional wells carried studs bearing on the anvils extending upwardly from the upper perforated pressure plate and through the weirs. These studs were tightened occasionally during operations to keep the bed of graphite granules compacted.

Amalgam from the electrolytic cell flowed into the decomposer filling the circular well formed by the walls and shoulder of the container and covering the distributor plate to a depth of about ⅛ inch before overflowing through the weirs. The amalgam passed through the upper perforated pressure plate, through the bed of graphite, and the lower perforated pressure plate leaving as mercury through the bottom outlet for recycle to the electrolytic cell. Water was introduced into the center of the chamber between lower perforated plate and the bottom of the container, rising countercurrent to the amalgam through the bed of graphite, reacting with the amalgam to form hydrogen gas and caustic soda. Both the hydrogen and the caustic soda rise through the upper perforated plate and the weirs in the decomposer plate into the upper part of the container. Hydrogen exits via the outlet in the cover and aqueous caustic via the outlet in the side of the upper part of the container arranged at a level above that of the amalgam.

*Example I*

A number of decomposers, similar to that shown in FIGURE 4, were fabricated of carbon steel and installed with an equal number of mercury cells. Each decomposer was about 40 inches high. The lower part of the container had a height of about 30 inches and a diameter of 36 inches. The upper part was about 9 inches in height and 40 inches in diameter. The shoulder joining the upper and lower parts of the container was a flat ring about 1½ inches between its inner and outer circumferences. The bottom had a 12 inch diameter outlet for mercury which led to a 3 inch pipe. Twelve pedestals 1½ inches in height were symmetrically arranged and welded to the bottom and the lower perforated pressure plate was welded thereto. Perforations consisted of ¼ inch diameter holes on ½ inch triangular spacing affording about 23 percent open area. In the side of the lower part of the container a water inlet was formed by swaging ½ inch pipe inside the threaded end of 1 inch pipe. The latter was threaded into a 1 inch nipple welded to the container. The ½ inch section extended approximately to the center of the chamber between the lower perforated pressure plate and the bottom of the container.

The lower part of the container was filled with crushed graphite on which was placed an upper perforated pressure plate. The latter had a diameter leaving clearance of ¼ inch between its edges and the walls of the lower part of the container.

The upper plate was perforated similarly to the lower plate. The upper plate carried 12 symmetrically arranged anvils 8½ inches high and 1 inch in diameter. The plate was placed, anvils up, on top of the bed of graphite. The distributor plate had a diameter about 1½ inches greater than the internal diameter of the lower portion of the container. It rested on the shoulder with the anvils protruding through the weirs. The weirs were fabricated of 2 inch pipe threaded into holes symmetrically arranged to receive the anvils attached to the upper perforated pressure plate. Each weir had 6 rectangular notches ½ inch wide and equally spaced around the 2 inch pipe. The amalgam inlet was arranged in the side of the upper part of the container just above the shoulder joining the upper and lower parts of the container. A caustic outlet was provided in the upper part of the container 180° from the amalgam inlet and at a higher elevation.

A spider having six symmetrical arms of angle iron was fabricated and holes were drilled in the ends of the arms. A nut was welded under each hole and a stud threaded therethrough. The spider was inserted between the anvils with the end of each arm under an angle welded to the side of the upper part of the container.

The studs were tightened to hold the amalgam distributor plate in place against part of the shoulder of the container.

The cover, bolted to the top of the upper part of the container, carried a hydrogen outlet and a number of wells symmetrically arranged to register with the anvils on the upper perforated pressure plate. The wells had studs threaded through internal flanges in the wells. The studs were tightened against the anvils extending upwardly from the upper perforated pressure plate and through the weirs. These studs were tightened occasionally during operations to keep the bed of graphite granules compacted.

This decomposer operated in the same manner as the one described in Example I.

What is claimed is:

In an amalgam decomposer comprising a container with amalgam inlet, mercury outlet, water inlet, aqueous caustic outlet and hydrogen outlet; the combination of:

(1) a fixed lower perforated pressure plate disposed in the lower part of said container above the bottom of said container, thereby forming a chamber between said lower perforated pressure plate and said bottom; and (2) a movable upper perforated pressure plate contacting a bed of graphite granules disposed between said fixed lower perforated pressure plate and said movable upper perforated pressure plate; and (3) screw adjustable means disposed between the cover of said container and said upper perforated pressure plate for urging said upper perforated pressure plate in the direction of and into contact with said bed of graphite granules.

References Cited by the Examiner

UNITED STATES PATENTS

| | | | |
|---|---|---|---|
| 2,083,648 | 6/37 | Gorke | 204—249 |
| 2,423,351 | 7/47 | Taylor | 204—249 |
| 2,905,323 | 9/59 | Megesi | 204—249 |

FOREIGN PATENTS 846,603  8/60  Great Britain.

JOHN H. MACK, *Primary Examiner.*

JOSEPH REBOLD, *Examiner.*